April 17, 1962 H. ROSENTHAL 3,030,256
REINFORCED LAMINATED PANELS WITH FOAM CORE
Filed March 8, 1960 4 Sheets-Sheet 1
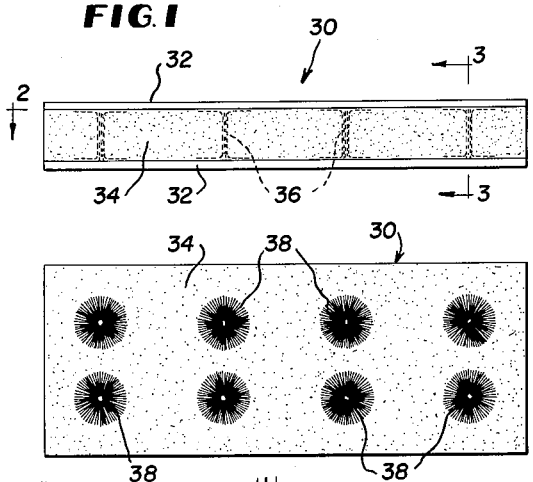
FIG.1
FIG.2
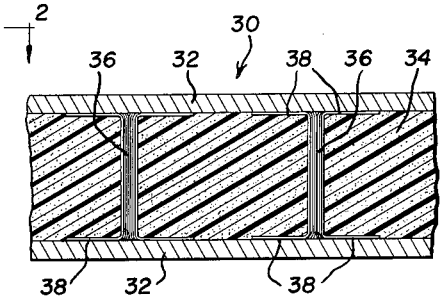
FIG.3
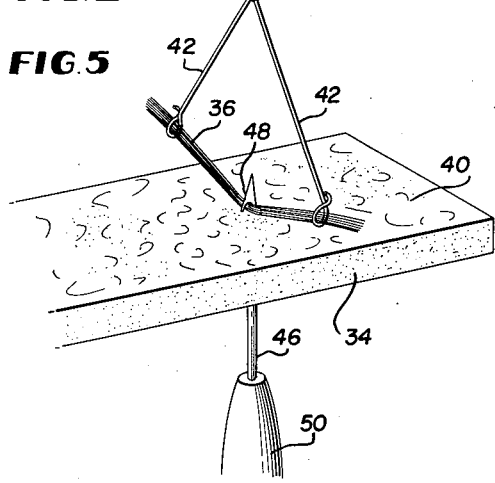
FIG.5
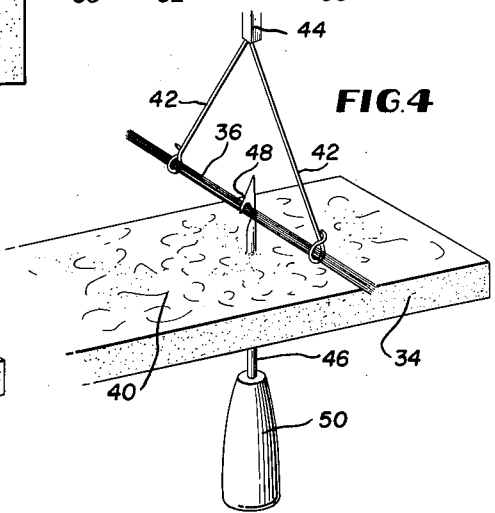
FIG.4
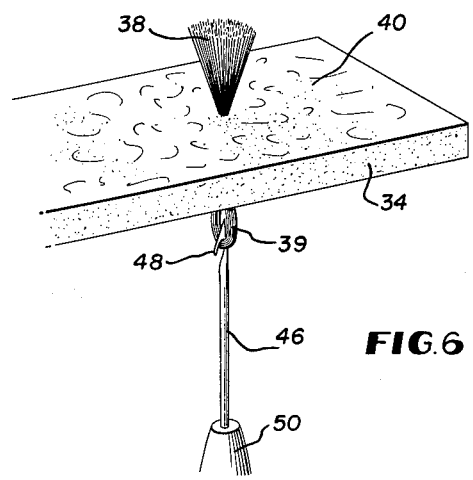
FIG.6
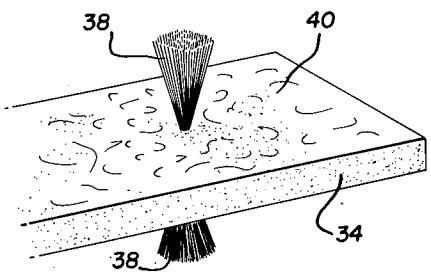
FIG.7
INVENTOR.
HARRY ROSENTHAL
BY
ATTORNEY

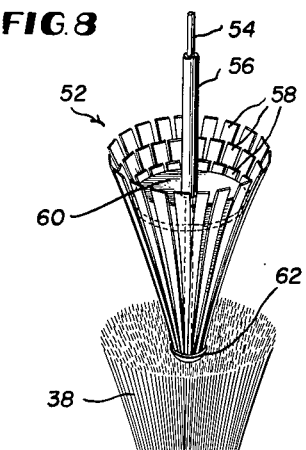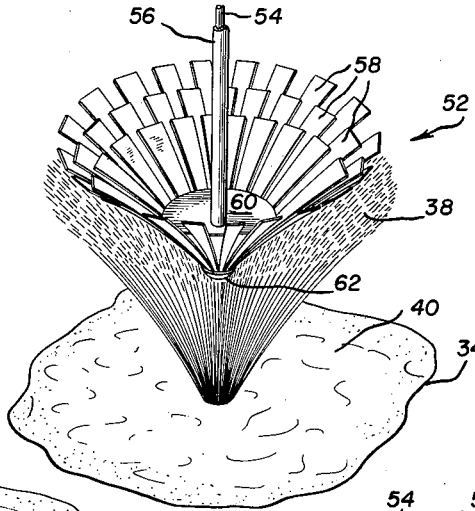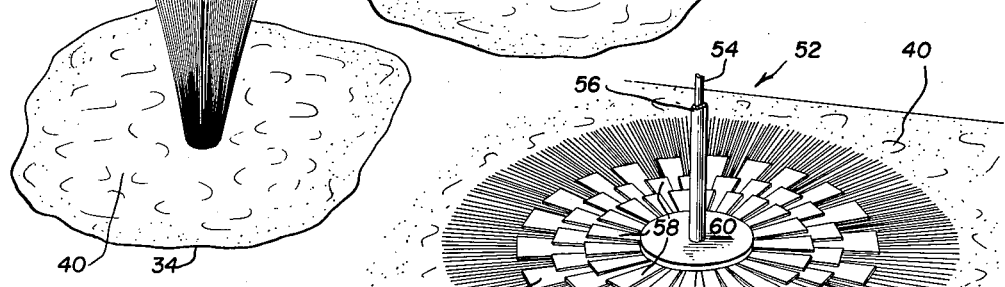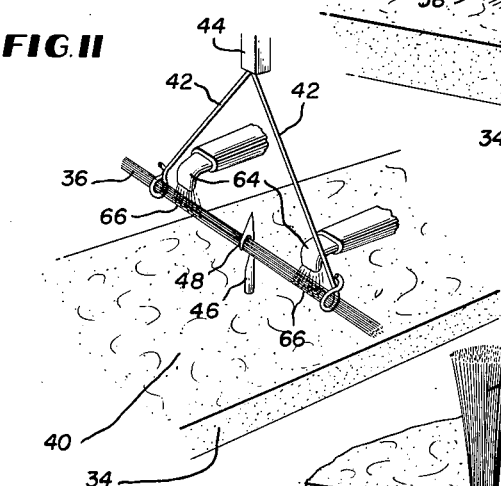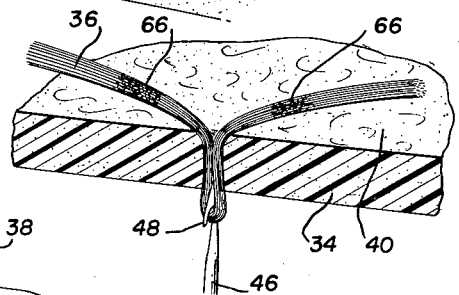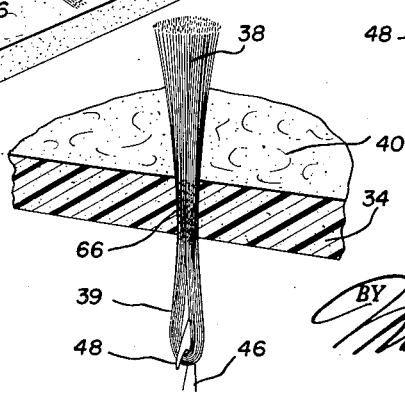

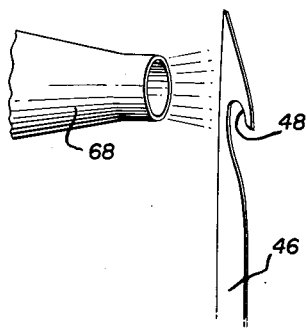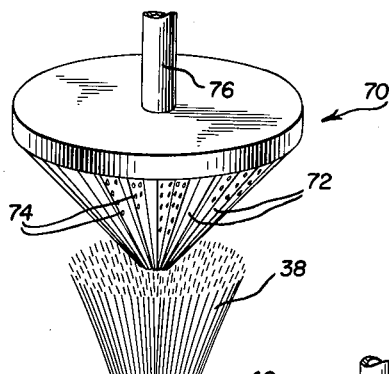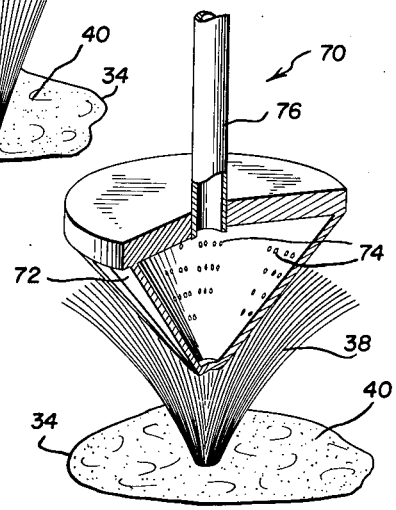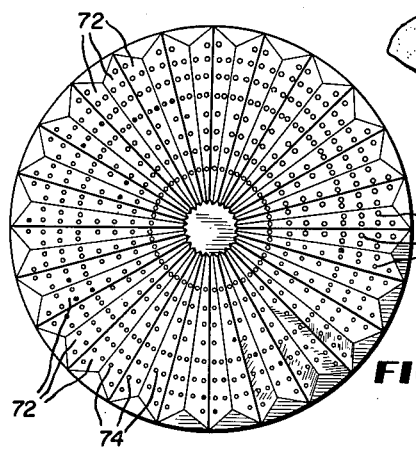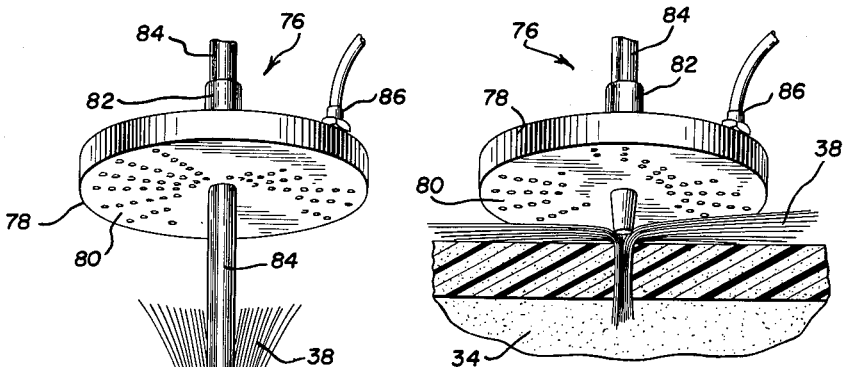

April 17, 1962  H. ROSENTHAL  3,030,256
REINFORCED LAMINATED PANELS WITH FOAM CORE
Filed March 8, 1960  4 Sheets-Sheet 4

INVENTOR.
HARRY ROSENTHAL
BY
ATTORNEY

United States Patent Office 3,030,256
Patented Apr. 17, 1962

3,030,256
REINFORCED LAMINATED PANELS WITH FOAM CORE
Harry Rosenthal, 304 Lake Circle, Portsmouth, Va.
Filed Mar. 8, 1960, Ser. No. 13,481
19 Claims. (Cl. 154—45.9)

This invention relates generally to laminated panels for architectural and other uses, and more particularly to improvements in the structure and method of fabricating such panels.

Laminated panels, for structural and decorative purposes, are in common use and comprise a plurality of layers, often of different materials, bonded together. An especially favored construction embodies skin layers of thin sheet metal, or wood, adhered to a core layer composed of a plastic foam. The foam, or expanded plastic, provides cellular spaces within the core which lighten the panel and yield other desirable properties such as heat and sound insulation, buoyancy, resistance to passage of vapor, and the like.

Foam cores are, however, structurally weak and it is difficult to form a strong bond between the core layer and the skin layer in these panels. The current practice is to adhere the foam core to the skin with an adhesive, and to apply pressure or heat to strengthen the bond. A less frequently used method is to mold the expandable plastic to the skin in a form, but this is a rather difficult and expensive process. In either case, the laminates produced are structurally weak and subject to separation of the laminate layers.

It is a primary object of the present invention to provide an improved laminated panel of the described character having higher tensile, compressive and flexural strengths and stronger bonds between the laminate layers.

It is a further object of the invention to provide an improved laminated panel embodying a foam material of lower density and lower cost yet having greater strength and improved structural characteristics.

Another object of the invention is to provide a laminated panel of the described character in which the inherent weakness of the foam core is offset by insertion of reenforcing means therethrough and secured to the skin layer.

Still another object of the invention is to provide a laminated panel of the described character in which the tendency of the foam core to separate from the skin layer is counteracted by the inclusion of reenforcing means inserted through the core, bent between the core and skin layers, and bonded to both the core and the skin.

A still further object of the invention is to provide improved methods of fabricating laminated panels of the described character, which methods yield structurally stronger products.

These objects are met in the instant invention by inserting reenforcing means, in the form of bundles of fibrous, yarnlike materials or metallic members, through the core laminate to extend beyond its surface, spreading or bending the reenforcing elements into engagement with the core surfaces and then adhering the bent fiber or metal end portions to both the core and skin surfaces.

The novel features that are considered characteristics of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a side elevation of a panel constructed in accordance with the invention;

FIG. 2 is a plan view of the upper surface of the panel core taken on line 2—2 of FIG. 1 and looking downwardly;

FIG. 3 is an enlarged fragmentary section taken on line 3—3 of FIG. 1 and looking in the direction of the arrows;

FIG. 4 is a fragmentary perspective diagram illustrating the start of a method of inserting fibrous reenforcing elements through the core of a panel;

FIGS. 5, 6 and 7 are views similar to FIG. 4 illustrating subsequent stages in the insertion of the reenforcing elements;

FIG. 8 is a fragmentary perspective diagram illustrating a means for spreading the reenforcing fibers;

FIGS. 9 and 10 are views similar to FIG. 8 showing stages in the spreading operation subsequent to the initial stage of FIG. 8;

FIG. 11 is a fragmentary perspective diagram similar to FIG. 4 illustrating means for impregnating the reenforcing fibers to harden and strengthen the portions which will ultimately lie within the core;

FIGS. 12 and 13 are views similar to FIG. 11 illustrating subsequent stages in the insertion of the impregnated fibers;

FIG. 14 is a fragmentary perspective diagram illustrating a means for preheating the needle utilized to draw the reenforcing fibers through the core;

FIG. 15 is a fragmentary perspective diagram similar to FIG. 8 illustrating combined mechanical and fluid pressure means adapted to spread the reenforcing fibers;

FIG. 16 is a view similar to FIG. 15 illustrating an initial stage of the spreading operation and showing the spreading means partially cut away;

FIG. 17 is a bottom plan view of the spreading means of FIG. 15;

FIG. 18 is a fragmentary perspective diagram similar to FIG. 8 illustrating another combined mechanical and fluid pressure device adapted to spread the reenforcing fibers;

FIG. 19 is a view similar to FIG. 18 illustrating a later stage of the spreading operation;

Figure 20:
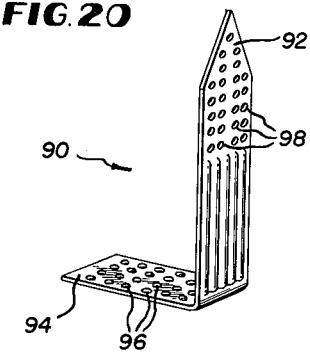
FIG. 20 is a perspective view of a metallic reenforcing element which may be used in place of the fibers.

Referring now more particularly to the drawings, FIGS. 1–3 illustrate the construction of an improved panel in accordance with a preferred embodiment of the invention. The panel bearing the general reference numeral 30 comprises a pair of outer layers 32, or skins, and an inner layer 34, or core. The skins 32 are sheets of metal, plywood, compressed fibers, or any other material of suitable strength or finish required for a structural or decorative function. If desired, one of the skins may be omitted. Alternatively, additional layers or plies may be added to improve structural load bearing characteristics among other things.

The core, or inner layer, 34 may likewise be formed of many different materials. One general class of such materials, highly suitable as core material because of its insulating property, may be termed "foam plastic" or "expanded plastic." This class comprises a wide variety of thermoplastic materials, such as expanded polystyrene which is a plastic to which a suitable expanding agent has been added that reacts to heat to form the polystyrene into a homogeneous cellular structure. The named material is available commercially in extruded sheet form under the trade name "Styrofoam." A similar commercial product termed "Beadboard" comprises beads or pellets of expanded polystyrene molded into sheet form. Another general class of suitable core materials is foam plastic materials which are not thermoplastic, such as foam penolic, foam epoxy and rigid polyurethane. These materials like the thermoplastics may be utilized as core materials comprising low density foam plastics defined as those weighing four pounds or less per cubic foot.

In conventional laminated panels the skin 32 and core 34 are bonded together by application of a suitable adhesive between their surfaces, accompanied sometimes by the application of pressure and/or heat. As previously indicated, the resultant panel is somewhat weak structurally and subject to breakdown of the core surface with consequent separation from the skin. To overcome these defects, the present invention provides a plurality of reenforcing members 36 extending through the core and whose ends 38 are bent into overlapping engagement with the core surface.

In the illustrated embodiment, members 36 each comprise a bundle of fiberglass strands whose ends 38 are fanned out above and below the core into wheel-spoke patterns and bonded to both the skin and core surfaces with the same adhesive that bonds these layers. Thus, the reenforcing members cover a relatively large proportion of the core surface and materially strengthen the bond of the core to the skin. In addition, the portions 36 of the reenforcing strands increase the tensile and flexural strengths of the panel.

FIGS. 4–10 illustrate various steps in a preferred method of fabricating the improved panel of the present invention. The method comprises first forming the core and skin layers in their desired configuration and size. Next, a coating of a suitable adhesive 40 is applied to one or both sides of the core 34. A group or bundle 36 of fiberglass yarn, or rovings, are then supported above and substantially parallel to the core surface by fingers 42 attached to a holding bar 44. A hook ended needle 46 is pierced upwardly through the core 34 to engage the strands 36 under the hook end 48, as shown in FIG. 4. The needle is then withdrawn by hand 50 to pull the strands 38 through the core, as progressively illustrated in FIGS. 5 and 6. Withdrawal of the needle hook 48 from the strands 36 then leaves a tuft of yarn ends 38 above the core and a loop 39 below the core. This loop is then cut to leave a tuft of strands 38, FIG. 7, projecting below the core similar to that above.

FIGS. 8–10 illustrate successive stages in the application of a mechanical device 52 to spread the fiberglass ends 38 into engagement with the adhesive coating 40 on the core layer 34. The device 52 comprises an inner shaft 54 and an outer shaft 56. At the base of shaft 54, above the spherical end cup 62, are attached several tiers of flexible petals 58 of spring steel, plastic or rubber and connected at their inner ends to the shaft. The upper tiers of petals are progressively shorter, are in overlapping relation, and are adapted to be spread first into conical shape, FIG. 9, and then into a circular pattern by downward movement of shaft 56. To accomplish this, the lower end of shaft 56 is secured to a collar having a flat washer 60 affixed thereto. As is evident from FIGS. 8, 9 and 10, the described movement of the conical device 52 into the center of the top of the tuft of strands 38 fans out the tuft strands and ultimately flattens them into a wheel-spoke design for adhesion to the tacky coating 40 on the core surface.

The described procedure for inserting the reenforcing elements 36 and spreading the tuft ends 38 is repeated for the remaining elements, and the spreading is performed on one or both sides of the core. The core 34 and one or both skins are then placed against each other and pressure, with or without heat, applied to harden the tacky adhesive 40 and bond the skin, core and reenforcing elements together.

FIGS. 11–13 illustrate apparatus for modifying the method described above to impregnate the reenforcing strands 36 with a strengthening and stiffening agent. As shown in FIG. 11, a pair of spaced spray nozzles 64 are positioned over the reenforcing strands 36 to direct sprays of the stiffening substance to those portions of the strands which will ultimately be drawn into the core 34 by movement of the needle 46. The impregnating material is preferably a vaporized epoxy resin, or other suitable material, which will harden firmly and stiffen the strand portions 66 after they are drawn into the core layer. The resin when hardened as shown in FIG. 13, also binds the strands to the core material 34. Thus, the compressive strength of the completed laminated panel is greatly increased. To fabricate a panel strengthened in this way, the method previously described is followed except for the addition of the step of spraying the fiber strands 36 to saturate them with a hardening resin.

FIG. 14 illustrates apparatus for preheating the needle 46 before its insertion into the core layer. This apparatus may suitably take the form of a nozzle 68 positioned to direct a blast of hot air or other fluid to the point, or hooked end 48, of the needle 46. Use of a heated instrument to pierce the expanded foam material is an aid to cutting through the expanded thermoplastic foams and, particularly in the beaded foam, prevents fracture of the beads on the opposite side and formation of unsatisfactory jagged craters obtained with a cold needle.

A modified device 70 utilizing air, or other fluid, under pressure to spread the tufts 38 of reenforcing fiber is illustrated in FIGS. 15–17. The device 70 comprises a hollow, inverted cone whose conical wall is preferably corrugated as at 72 and perforated by a large number of openings 74. A hollow shaft 76, secured to the base, admits fluid under pressure to the conical body and also serves to lower it into the tufts 38. The blast of air escaping through the perforations 74 strikes the strands 38 and forces the fibers onto the tacky coating 40 to form a matted, spoke-wheel design.

FIGS. 18 and 19 show another device 76 which may be used in place of apparatus 70 to spread the fiber tufts 38. This modification embodies a hollow disc 78 having a perforated bottom 80 and secured to the lower end of a tube 82 which rides up and down on the shaft 84. The hollow disc 78 derives its air supply from intake 86, connected to a source of compressed air not shown. The disc is in an elevated position, FIG. 18, when the leading end of shaft 84 is pushed into a tuft 38. The disc is then forced downwardly on shaft 84, see FIG. 19, while at the same time, a blast of air is blown out of the bottom of the disc forcing the fibers 38 to spread and mat into a wheel-spoke pattern.

In place of the fiberglass strands 36, it may frequently be desirable to use a stiffer, stronger reenforcing element in the laminated panel. Examples of such are illustrated in FIGS. 20–25. FIG. 20 shows a reenforcing element 90 of metal, or other rigid material, which is pointed at one end 92 and provided with a right angle flange 94 at the other end. Preferably, the element is centrally corrugated to increase its rigidity and also provided with perforations 96 and 98 for receiving the adhesive coating 40 and improving the bond with the panel skin.

Figure 21:
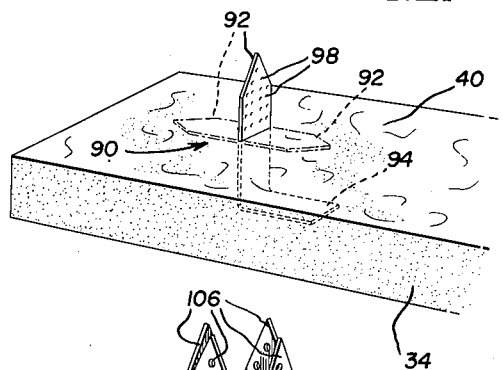
FIG. 21 is a fragmentary perspective view of the panel core with the reenforcing element of FIG. 20 inserted.

Desirably, the tip 92 of element 90 is preheated, in the manner illustrated in FIG. 14, and inserted through the core 34, FIG. 21, until flange 94 is flush against the core bottom surface. Then the extended point 92 is bent in either direction, as illustrated in broken lines, to engage the tacky coating 40 on the upper surface of the core. The panel may be completed in the previously described manner by joining the skin layer after an appropriate number of reenforcing elements 90 are applied to the core in any suitable pattern to yield the desired compressive strength. In certain instances, it may be desirable to bend the point 92 only 85° or so toward the core, leaving the final angle to be determined by the compression applied in affixing the skin layer.

Figure 22:
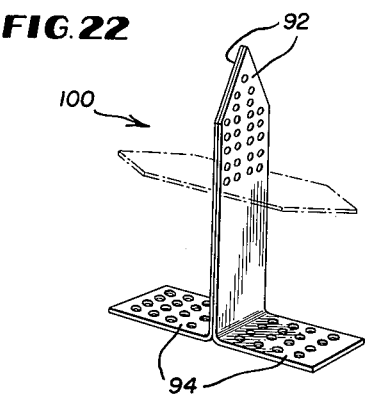
FIGS. 22, 23, 24 and 25 are views similar to FIG. 20 illustrating different metallic reenforcing elements which may be employed to strengthen the laminated panel.

FIG. 22 illustrates an alternate form of reenforcing element which is quite similar to that of FIG. 20, but yields more rigidity and more surface area for adhesion to the panel skin. This element, referenced by the numeral 100, is essentially a pair of elements 90 secured together by welding or otherwise in their central portions, thus providing a pair of lower flanges 94 and a pair of upper points 92 which may be spread in opposite directions after insertion of the element through the panel core.

Figure 23:
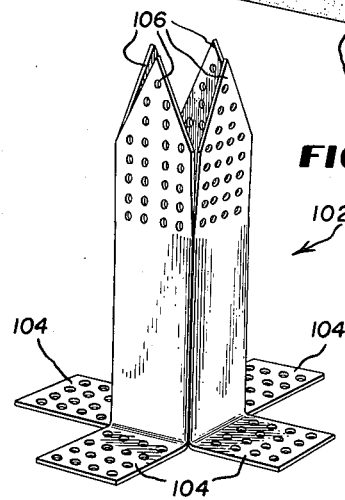

The modified metal reenforcing element 102 shown in FIG. 23 comprises a tube having four sides whose lower ends are flanged outwardly at 104 and whose upper ends are pointed as at 106. After insertion through a core, the pointed ends are bent outwardly. The tubular shape yields a great deal of strength and rigidity.

Figure 24:
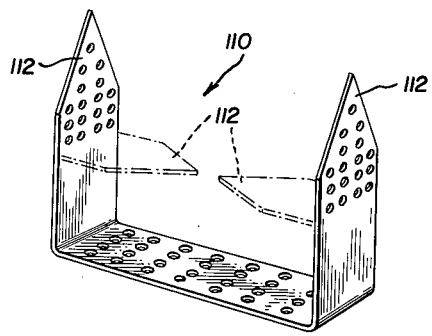

The modified reenforcing element 110 illustrated in FIG. 24 is shaped like a staple having pointed ends 112 which are bent to engage the core surface after the element is inserted.

Figure 25:
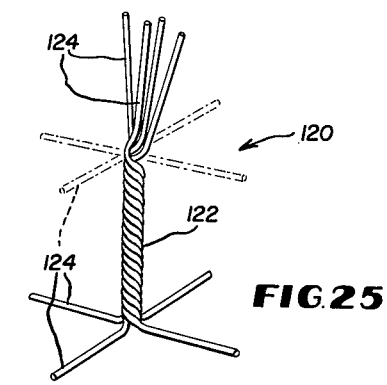

The modified reenforcing element 120 shown in FIG. 25 comprises two or more strands of wire twisted together in their central portions 122. After insertion through a panel core, the wire ends 124 are bent, as shown in broken lines, to engage the upper and lower core surfaces.

While the reenforcing elements illustrated in FIGS. 20–25 are all shown to be individual elements, it will be apparent that it is within the scope of the present invention to alter their shape, size and disposition within a panel. For example, it is feasible to combine reenforcing elements by utilizing a single strip or plate of flat or corrugated metal, parallel to outer skin layers and having a plurality of individual cutouts bent from and extending to and bonded to the skins. In such an instance, the foam inner layer, or layers on both sides of the metal plate, may be pierced by the individual metal cutouts or formed around them. It is also practicable to use a metal sheet perpendicular to the skins and whose ends are flanged for bonding to the core and skin layers. Such alternative constructions yield greatly strengthened panels able to sustain large structural loads.

It will be apparent from the above description that improved panels constructed by the methods outlined may serve to perform many useful purposes. Their increased strength makes them highly desirable in architectural applications whether structural or decorative in nature. Their application to use in building furniture, such as desk and table tops, will be obvious. Their added strength and buoyancy make them suitable for hulls or boats, particularly when the skin of the panel is fiberglass laminated to the expanded foam core. Their light weight and increased strength admirably suits the panels for use, in conjunction with plasters, cement, concrete or similar construction materials, in many applications in building construction. The added strength imparted by the reenforcing members enables the use of foam materials of lower density without sacrifice of strength and at lower cost.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A prefabricated laminated panel comprising at least one core sandwiched between outer layers of different material and bonded thereto on both engaging surfaces, reenforcing elements extending through said core, each element having both ends bent in overlapping relation to the core surfaces, and each end of each reenforcing element being adhered to both the core and the adjacent outer layer.

2. A laminated panel comprising at least one pair of skin sheets, an inner sheet, separating the skin sheets and adhered thereto on both engaging surfaces, reenforcing means extending through said inner sheet and having end portions bent to lie between said skin and inner sheets and each of said end portions being bonded to both the adjacent skin and inner sheets.

3. A laminated panel according to claim 2 wherein said inner sheet is formed of a thermoplastic foam material.

4. A laminated panel according to claim 2 wherein said inner sheet is formed of an expanded polystyrene.

5. A laminated panel according to claim 2 wherein said reenforcing means comprises fibrous elements.

6. A laminated panel according to claim 2 wherein said reenforcing means comprises a bundle of fibers whose ends are fanned out in wheel-spoke pattern to engage the inner and outer sheets.

7. A laminated panel according to claim 2 wherein said reenforcing means comprises a metal insert having flanges lying between said inner and skin sheets.

8. A laminated panel according to claim 2 wherein said reenforcing means comprises a plurality of wire strands twisted about each other and whose ends are bent to lie between said inner and skin sheets.

9. A laminated panel according to claim 2 wherein said reenforcing means comprises a tubular metal insert provided with end portions bent to lie between said inner and skin sheets in a plurality of spread flanges.

10. A core for use in fabrication of a laminated panel by sandwiching to a plurality of skin layers comprising a sheet of expanded foam-like material, reenforcing means inserted through said sheet and having end portions bent to overlie the surfaces of said sheet, and means bonding each of said end portions to said surfaces.

11. A core constructed in accordance with claim 10 wherein said expanded material is a thermoplastic and said reenforcing means comprises a bundle of fibers whose end portions are fanned out into a wheel-spoke design.

12. A core constructed in accordance with claim 10 wherein said expanded material is a thermoplastic and said reenforcing means comprises a metal insert having end flanges bent into engagement with the said surfaces of said sheet.

13. The method of fabricating a laminated panel comprising the steps of forming a skin layer, forming a core layer, inserting a reenforcing element through said core layer, bending the ends of said reenforcing element toward the surfaces of said core layer, and bonding said ends of the reenforcing element, skin and core layers together with said bent ends of the reenforcing element lying between the layer surfaces.

14. The method of fabricating a laminated panel comprising the steps of forming a skin layer, forming a core layer of expanded thermoplastic material, coating the surfaces of said core layer with an adherent material, holding a bundle of fibers adjacent to one surface of said core layer, inserting a needle through said core layer from the other surface, engaging the needle end over said bundle of fibers, withdrawing said needle to draw the fibers through said core layer, cutting the resultant fiber loop at one side of the core layer to leave tufts of fibers at both sides of the core layer, fanning out said tufts to bend the fiber ends into engagement with the surfaces of said core layer in contact with said adherent material, and bonding said skin and core layers to each other.

15. The method of fabricating a laminated panel according to claim 14 wherein is added the step of heating said needle prior to insertion through said core layer.

16. The method of fabricating a laminated panel according to claim 14 wherein said step of fanning out said tufts is performed by application of a conical device thereto.

17. The method of fabricating a laminated panel according to claim 14 wherein said step of fanning out said tufts is performed by application of fluid pressure thereto.

18. The method of fabricating a laminated panel according to claim 14 wherein said bundle of fibers is additionally sprayed with a resin in portions thereof prior to their drawing through the said core layer whereby the fiber portions ultimately drawn into the core layer are impregnated with a hardening material.

19. A laminated panel according to claim 2 wherein said inner sheet is formed of a low density foam plastic.

References Cited in the file of this patent

UNITED STATES PATENTS

| | | |
|---|---|---|
| 2,362,119 | De Stefano | Nov. 7, 1944 |
| 2,429,486 | Reinhardt | Oct. 21, 1947 |